United States Patent
Shu et al.

(10) Patent No.: US 6,959,278 B1
(45) Date of Patent: Oct. 25, 2005

(54) SYSTEMS AND METHODS FOR IMPLEMENTING SEGMENTATION IN SPEECH RECOGNITION SYSTEMS

(75) Inventors: Chang-Qing Shu, Billerica, MA (US); Han Shu, Billerica, MA (US)

(73) Assignees: Verizon Corporate Services Group Inc., New York, NY (US); BBNT Solutions LLC, Cambridge, MA (US)

( * ) Notice: Subject to any disclaimer, the term of this patent is extended or adjusted under 35 U.S.C. 154(b) by 619 days.

(21) Appl. No.: 09/826,715

(22) Filed: Apr. 5, 2001

(51) Int. Cl.[7] ............................................. G10L 15/00

(52) U.S. Cl. .................................... 704/243; 704/231

(58) Field of Search ............................. 704/231, 234, 704/243

(56) References Cited

U.S. PATENT DOCUMENTS

| | | | | |
|---|---|---|---|---|
| 4,918,731 A | * | 4/1990 | Muroi | 704/253 |
| 5,806,030 A | * | 9/1998 | Junqua | 704/245 |
| 5,806,034 A | * | 9/1998 | Naylor et al. | 704/256 |
| 5,812,972 A | * | 9/1998 | Juang et al. | 704/234 |
| 5,862,519 A | * | 1/1999 | Sharma et al. | 704/231 |
| 6,535,851 B1 | * | 3/2003 | Fanty et al. | 704/249 |

OTHER PUBLICATIONS

Ruey-Chiang Shyu et al., "Improvement in Connected Mandarin Digit Recognition by Explicitly Modeling Coarticulatory Information", Journal of Information Science and Engineering 16, 649-660 (2000).*

Jordan R. Cohen; *Segmenting speech using dynamic programming*; J. Acoust. Soc. Am., vol. 69 No. 5, May 1981; pps 1430-1438.

Steven C. Lee and James R. Glass; *Real-Time Probabilistic Segmentation for Segment-Based Speech Recognition*; International Conference on Spoken Language Processing, Sydney Australia, 1998.

* cited by examiner

*Primary Examiner*—Daniel D Abebe
(74) *Attorney, Agent, or Firm*—Leonard C. Suchtya, Esq.; Joel Wall, Esq.

(57) ABSTRACT

A speech recognition system (105) includes an acoustic front end (115) and a processing unit (125). The acoustic front end (115) receives frames of acoustic data and determines cepstral coefficients for each of the received frames. The processing unit (125) determines a number of peaks in the cepstral coefficients for each of the received frames of acoustic data and compares the peaks in the cepstral coefficients of a first one of the received frames with the peaks in the cepstral coefficients of at least a second one of the received frames. The processing unit (125) then segments the received frames of acoustic data based on the comparison.

9 Claims, 10 Drawing Sheets

SYSTEMS AND METHODS FOR IMPLEMENTING SEGMENTATION IN SPEECH RECOGNITION SYSTEMS

FIELD OF THE INVENTION

The present invention relates generally to speech recognition systems and, more particularly, to systems and methods for improving the segmentation of acoustic data within speech recognition systems.

BACKGROUND OF THE INVENTION

Speech recognition systems conventionally use phonemes to model speech. The duration of various phonemes in input speech utterances can be different, therefore, a conventional speech recognizer performs a segmentation process on the spoken utterance to divide the utterance into segments of speech, where each segment corresponds to a phonetic or sub-phonetic unit. A conventional speech recognizer further maps the segmented utterance into certain phonemes or Hidden Markov Model (HMM) states to complete the speech recognition process. The accuracy of the speech recognition process is, thus, dependent on the segmentation performed by the speech recognizer.

Hidden Markov Models (HMMs) are conventionally used to model phonetic units. During conventional HMM expectation maximization (EM) training, HMM models are updated to increase the likelihood of training data. Usually the segmentation of the speech utterances also improves over each iteration of training. Due to a number of reasons, such as, for example, obtaining a poor initial model and the independence assumption with the HMM, segmentation using HMM implicitly during training and subsequent recognition can be poor. Based on the segmentation, the conventional HMM decoder computes phoneme recognition scores that are used to recognize the input speech utterances. The poor segmentation achieved with convention HMM decoders, therefore, has a significant negative impact on the accuracy of the speech recognizer.

As a result, there exists a need for a system and method that improves the segmentation of speech utterances in a speech recognition system.

SUMMARY OF THE INVENTION

Systems and methods consistent with the present invention address this and other needs by providing mechanisms that facilitate the segmentation of acoustic data input into a speech recognition system. For example, cepstral coefficients obtained from the speech recognition system front end can be used to improve the segmentation of acoustic data, thus, improving the accuracy of the speech recognition system.

In accordance with the purpose of the invention as embodied and broadly described herein, a method of segmenting acoustic data for use in a speech recognition process includes receiving frames of acoustic data, determining cepstral coefficients for each of the received frames of acoustic data, and segmenting the received frames of acoustic data based on the determined cepstral coefficients.

In another implementation consistent with the present invention, a method of recognizing patterns in acoustic data includes receiving frames of acoustic data, determining segmentation information corresponding to the received frames of acoustic data, determining at least one weighting parameter based on the determined segmentation information, and recognizing patterns in the received frames of acoustic data using the at least one weighting parameter.

In a further implementation consistent with the present invention, a method of recognizing patterns in acoustic data includes receiving frames of acoustic data, determining first segmentation information corresponding to the received frames of acoustic data, determining second segmentation information corresponding to the received frames of acoustic data, determining at least one weighting parameter based on the determined second segmentation information, and recognizing patterns in the received frames of acoustic data using the at least one weighting parameter.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods, consistent with the present invention, provide mechanisms that improve segmentation in a speech recognition system. Acoustic data received by the speech recognition system may be separated into frames by the speech recognition system front end. The speech recognition system may divide the frames into sets, such that each set contains a phoneme or HMM state. The speech recognition system may identify the end frame number for each frame set and use the end frame number either during or after HMM decoding. In an implementation consistent with the present invention, the speech recognition system uses the cepstral coefficient peaks for each frame of received acoustic data as a basis for segmenting the acoustic data for improved speech recognition processing.

Exemplary Acoustic Recognition Device

Figure 1:
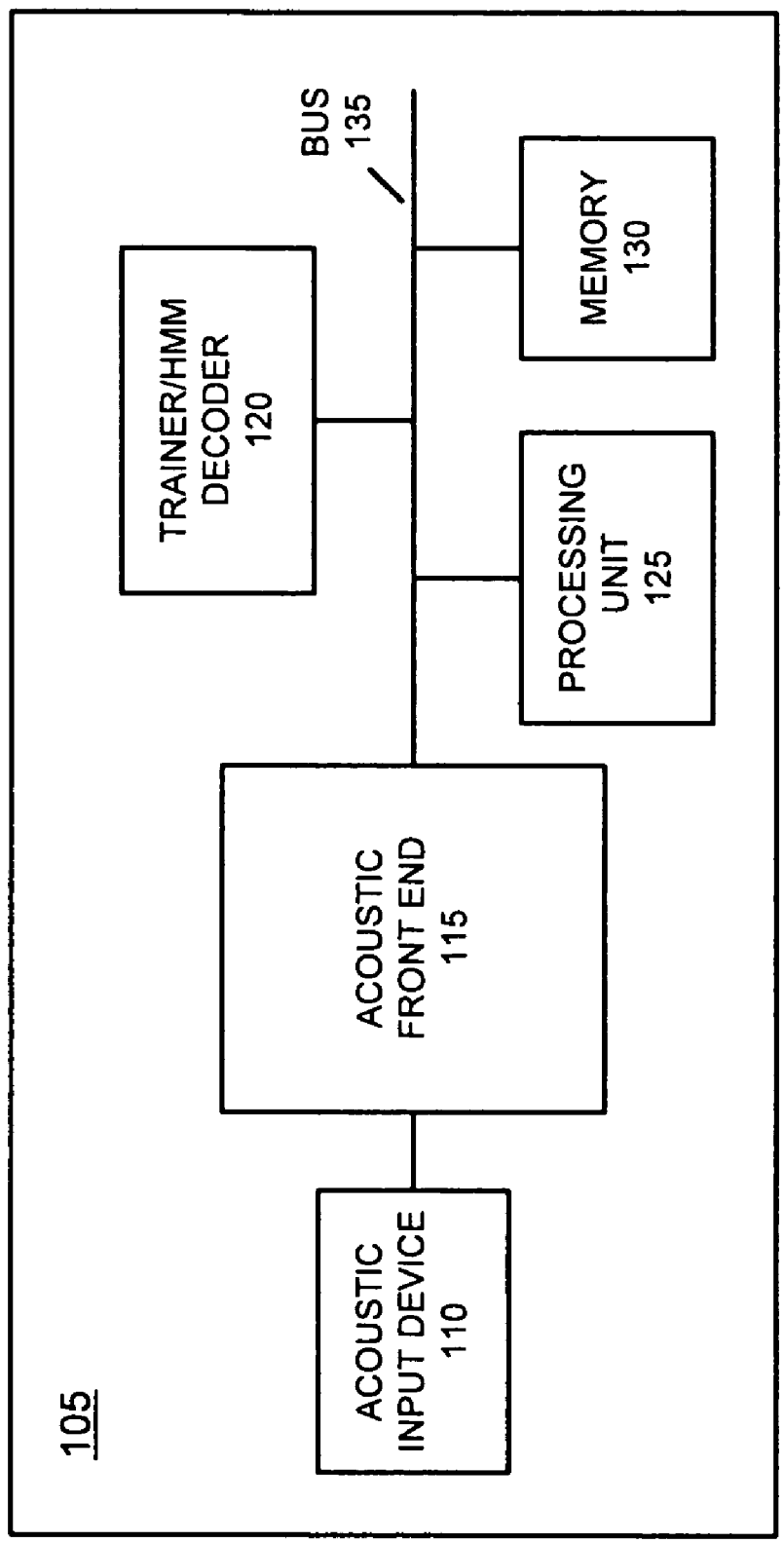
FIG. 1 illustrates an exemplary speech recognition device in which a system and method, consistent with the present invention, may be implemented.

FIG. 1 illustrates an exemplary speech recognition device 105 in which a system and method, consistent with the present invention, may be implemented to improve speech recognition accuracy. Speech recognition device 105 may include an acoustic input device 110, an acoustic front end 115, a Hidden Markov Model (HMM) decoder 120, a processing unit 125, a memory 130, and a bus 135.

Acoustic input device 110 may include conventional circuitry for sampling and converting analog acoustic input signals into digital signal form. For example, acoustic input device 110 may include a microphone (not shown) that converts acoustic input signals into analog electrical signals, and an analog-to-digital converter (not shown) for sampling the analog electrical signals and converting the signals from analog to digital signal form.

Acoustic front end 115 may include conventional circuitry for pre-processing the digital acoustic signal received from acoustic input device 110. Acoustic front end 115 receives the digital signal from acoustic input device 110 and, in accordance with conventional techniques, processes the signal to generate frame-based cepstra data. The frame-based cepstra data can include, for example, fifteen cepstral coefficients per frame. Acoustic front end 115 sends the frame-based cepstra data to either trainer/HMM decoder 120 or processing unit 125.

Trainer/HMM decoder 120 can perform speech recognition processing using conventional Hidden Markov Models and conventional expectation maximization (EM) model training techniques. Trainer/HMM decoder 120 may perform segmentation processing that divides the acoustic input signal into stationary segments in accordance with conventional techniques. Trainer/HMM decoder 120 may further perform recognition processing that includes mapping the segmented acoustic input signal into certain phonemes or phoneme HMM states using conventional HMM techniques. Trainer/HMM decoder 120 may be implemented in hardware or as a sequence of instructions for execution in a processing unit, such as processing unit 125.

Processing unit 125 may perform functions for processing data received from acoustic front end 115 and/or trainer/HMM decoder 120. Memory 130 provides permanent and/or semi-permanent storage of data and instructions for use by processing unit 125. Memory 130 may include large-capacity storage devices, such as a magnetic and/or optical recording medium and its corresponding drive. Bus 135 interconnects the various components of speech recognition device 105 to permit the components to communicate with one another.

The configuration of components of speech recognition device 105 illustrated in FIG. 1 is for illustrative purposes only. One skilled in the art will recognize that other configurations may be implemented.

Exemplary Cepstra-Based

Segmentation Progressing

Figure 2:
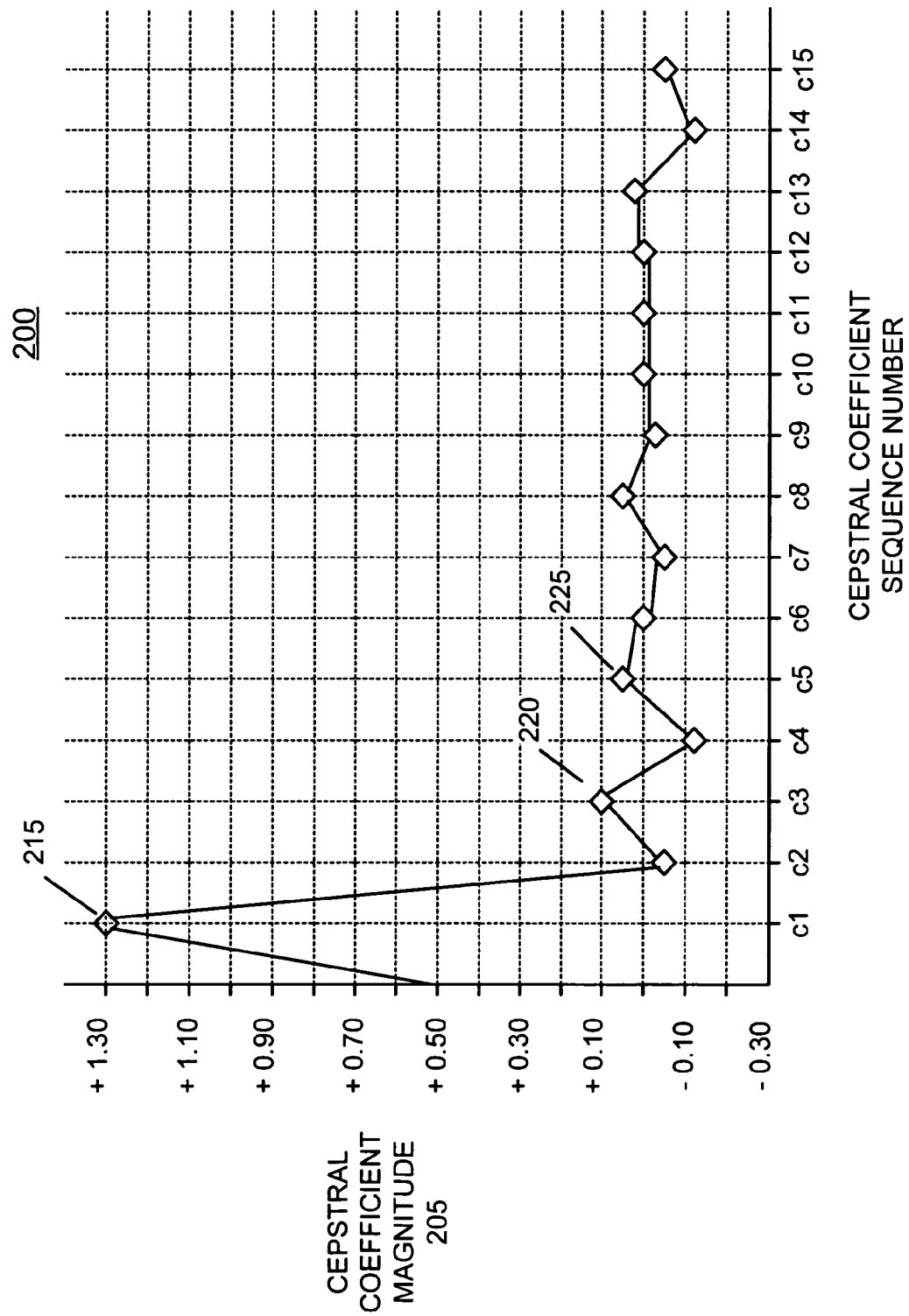
FIG. 2 illustrates a plot of cepstral coefficients for a frame of audio data consistent with the present invention.

FIG. 2 illustrates a graph 200 of cepstral coefficient data for a frame of acoustic data processed by acoustic front end 115. Graph 200 plots cepstral coefficient magnitude 205 on the Y-axis versus cepstral coefficient sequence number 210 on the X-axis. As can be seen in FIG. 2, a plot of the magnitudes of the cepstral coefficients for a frame of acoustic data forms a curve. The curve may include local maxima, or peaks, such as peaks 215, 220 and 225. For each frame of cepstral coefficient data, the number of coefficient peaks may be different. The number of cepstral coefficient peaks can be computed for each frame, thus, obtaining a sequence of cepstral coefficient peak numbers indexed by frame number.

The number of cepstral coefficient peaks change rapidly on frames corresponding to phoneme boundaries. Additionally, within each phoneme segment, there may be other frames where the number of cepstral coefficient peaks changes quickly. These frames further divide the original phoneme segment into smaller segments. These fragments can be considered HMM state segments.

FIGS. 3–6 are flowcharts that illustrate exemplary processing, consistent with the present invention, for providing cepstra-based segmentation of acoustic data. As one skilled in the art will appreciate, the method exemplified by FIGS. 3–6 can be implemented as a sequence of instructions and stored in a computer-readable medium, such as memory 130 of speech recognition device 105, for execution by processing unit 125. A computer-readable medium may include one or more memory devices and/or carrier waves. Alternatively, the process may be implemented in hardware or in any combination of hardware and software.

Figure 8:
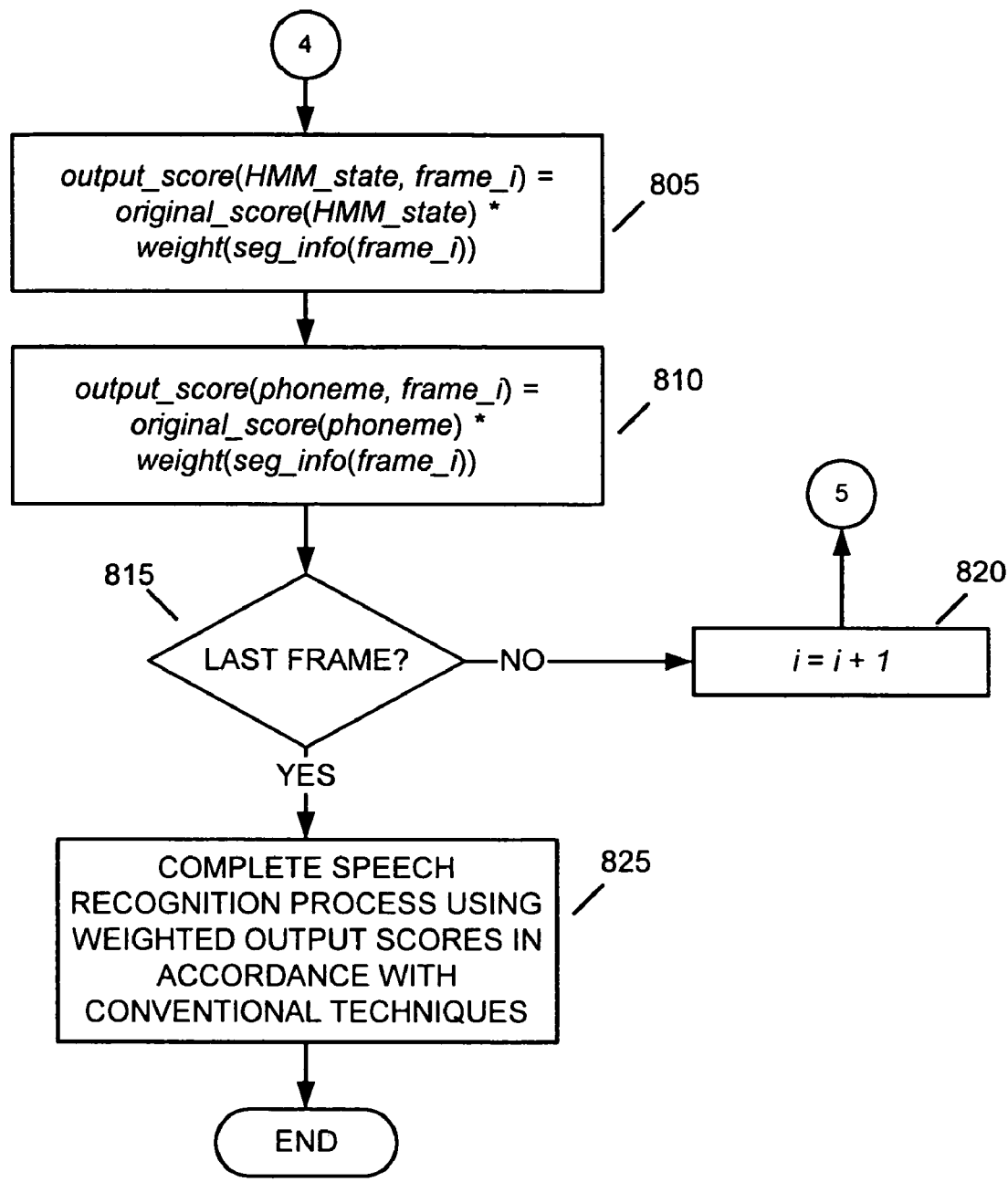
Figure 9:
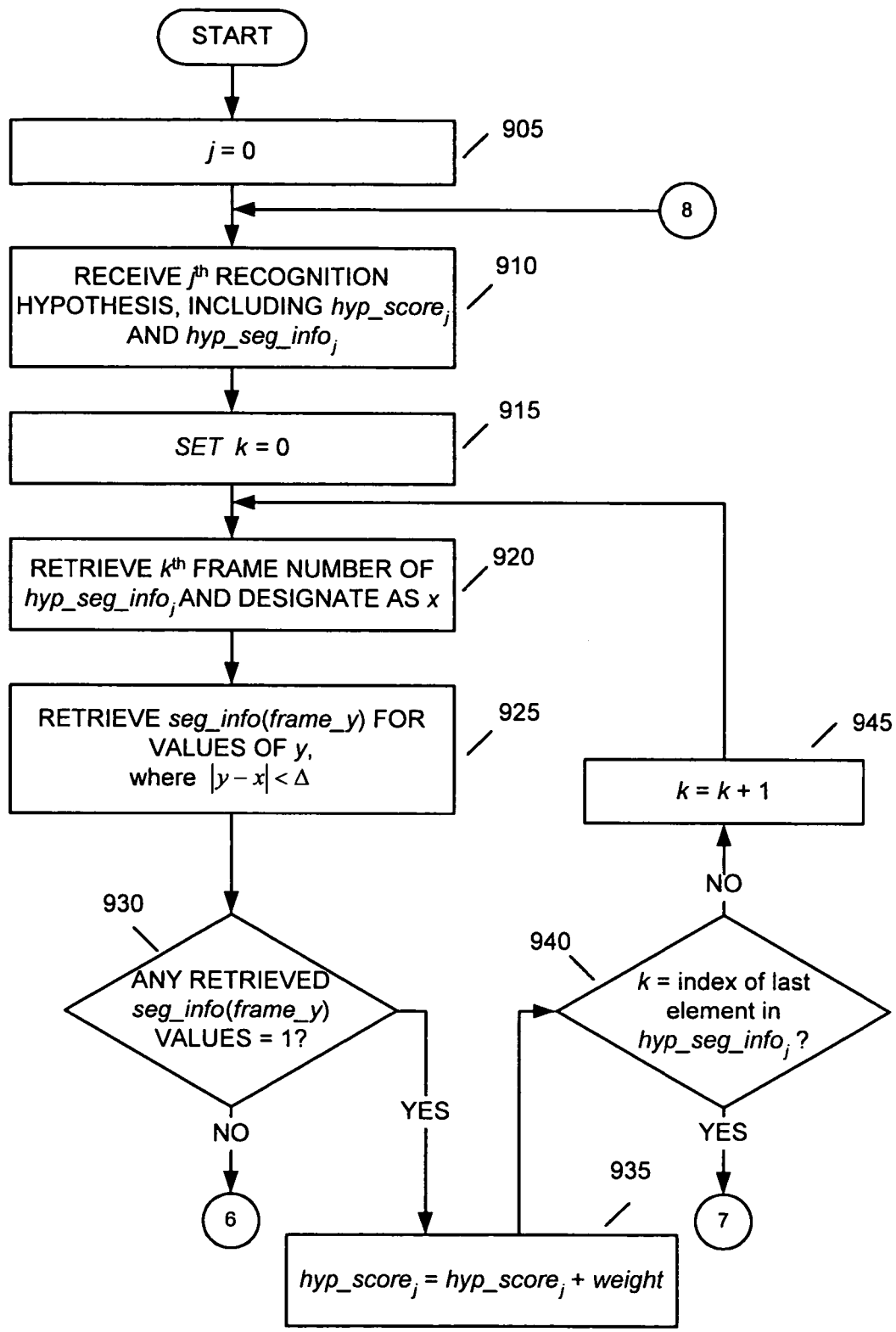
FIGS. 9–10 are flowcharts that illustrate exemplary system processing for weighting HMM decoder recognition hypothesis scores, using cepstra based HMM state/phoneme segmentation, consistent with the present invention.
Figure 10:
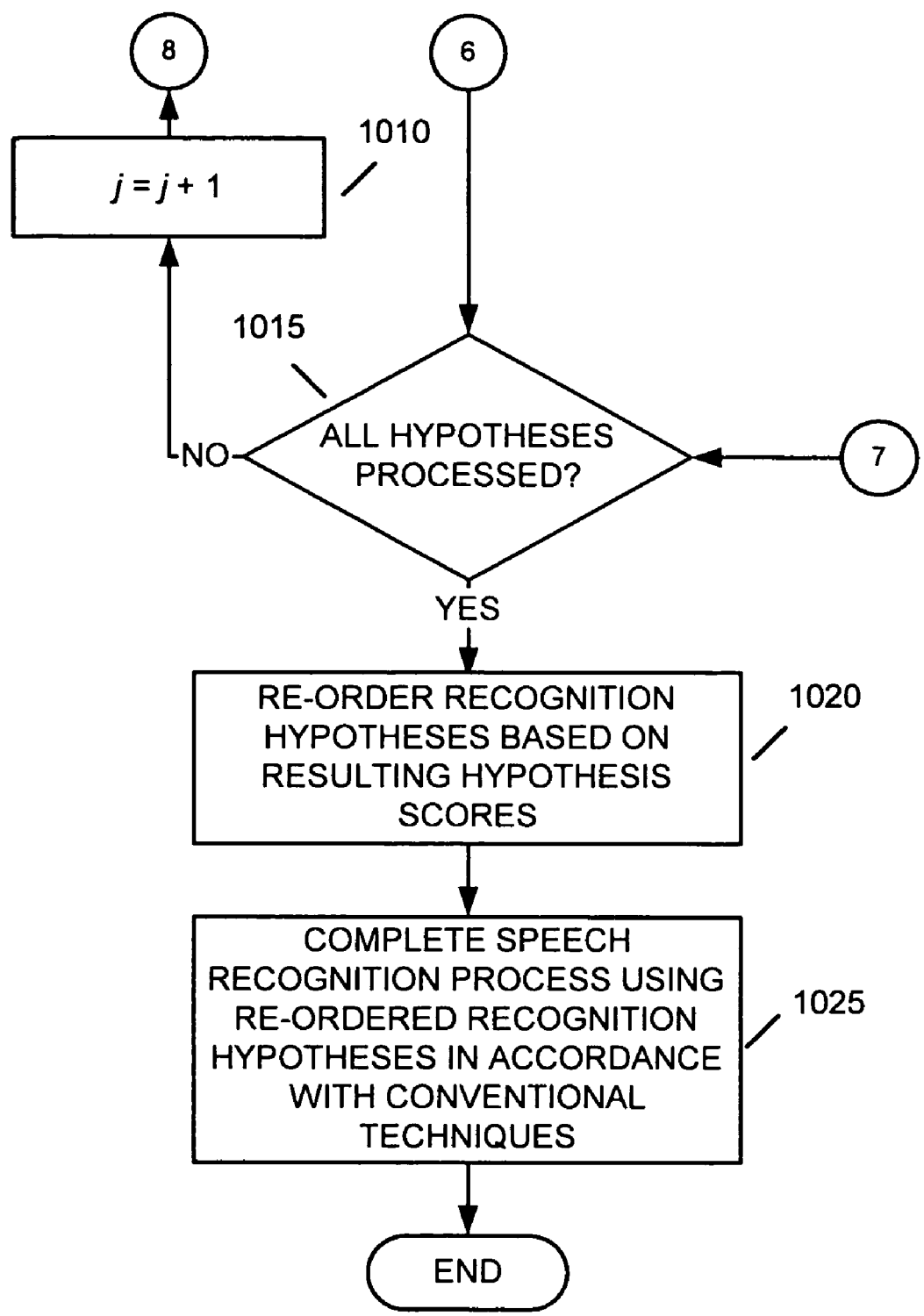

Generally, the method exemplified by FIGS. 3–6 generates the end frame number for each phoneme or HMM state using cepstra coefficient data and either uses the end frame number during processing by the trainer/HMM decoder 120 (FIGS. 7 and 8) or after processing by the HMM decoder 120 (FIGS. 9 and 10). In other implementations consistent with the present invention, other processes may be used to generate the end frame number for each phoneme or HMM state. In this case, the processing described below with regard to FIGS. 7–8 and 9–10 can be used or may be modified as appropriate to operate upon the end frame number.

To begin processing, processing unit 125 sets an array of segmentation information (seg_info(x)), stored in memory 130, to initialized values of −2[step 305]. Processing unit 125 may further initialize a frame index counter i by setting i to zero [step 310]. Processing unit 125 may then receive cepstra data ceps_data(frame_i) corresponding to the current frame (frame_i) from acoustic front end 115 [step 315]. Processing unit 125 can compute the number of cepstral peaks peak_num(ceps_data(frame_i)) in frame i using, for example, a graph of cepstral coefficient data such as graph 200 [step 320]. After computation of the number of cepstral peaks for frame_i, processing unit 125 may store peak_num(ceps_data(frame_i)) in memory 130 [step 325].

Figure 6:
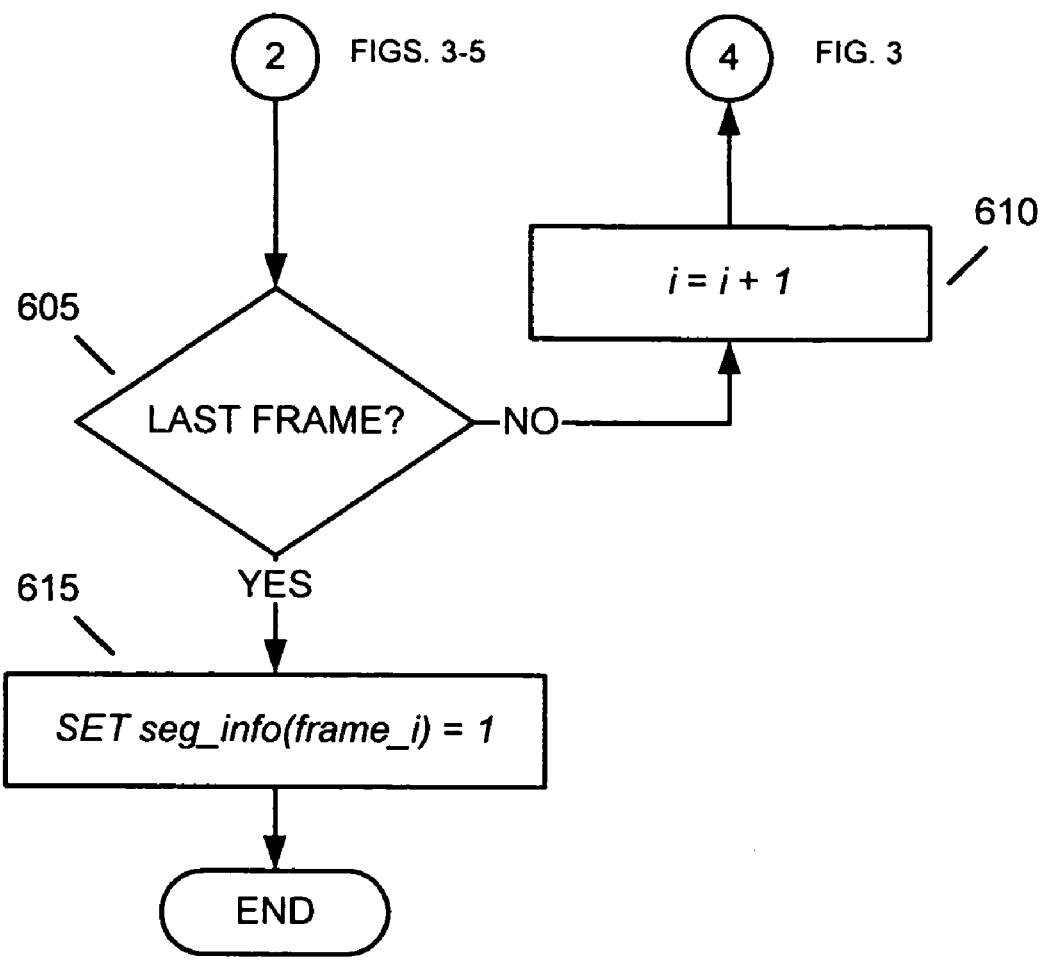

If the frame index counter i is currently set to zero [step 330], then processing unit 125 can set the segmentation information corresponding to frame_0 (seg_info (frame_0)) to zero [step 335] and then may proceed with step 605 (FIG. 6). If i is not equal to zero, then processing unit 125 may optionally continue with either a first technique or a second technique. In the first technique, beginning at step 405 (FIG. 4), processing unit 125 may determine if the number of cepstral peaks for the current frame (frame_i) subtracted from the number of cepstral peaks for the previous frame (frame_i−1) is greater than a value δ, and further if segmentation information determined for frame frame_i−2 is not equal to 1, as shown in the following relations (Eqn. (1)):

$$\text{peak\_num}(\text{ceps\_data}(\text{frame\_i}-1) - \text{peak\_num}(\text{ceps\_data}(\text{frame\_i})) > \delta$$

and $$\text{seg\_info}(\text{frame\_i}-2) \neq 1$$

If these conditions are satisfied, then processing unit 125 can set the segmentation information for the previous frame (seg_info(frame_i−1)) to 1 [step 415] and the segmentation information for the current frame (seg_info(frame_i)) to zero [step 420]. Otherwise, processing unit 125 may set the segmentation for the previous frame (seg_info(frame_i−1)) to −1 [step 410]. Processing may then continue with step 605 (FIG. 6).

In the second technique, beginning at step 505 (FIG. 5), processing unit 125 may determine if the number of cepstral peaks for the current frame (frame_i) subtracted from the number of cepstral peaks for a $j^{Ath}$ frame (frame_j) is greater than a value δ, and further if the number of cepstral peaks for an $x^{th}$ frame (frame_x) is greater than, or equal to, a number of cepstral peaks for an $(x+1)^{th}$ frame (frame_x+1), as shown in following relations (Eqn. (2)):

peak_num(ceps_data(frame_j))−peak_num
  (ceps_data(frame_i))>δ and peak_num(ceps_data(frame_x))≧peak_num
  (ceps_data(frame_x+1))

where frame_j≦frame_x≦frame_i

If these conditions are satisfied, than processing continues with step 520. If not, processing unit 125 may determine if the number of cepstral peaks for the current frame (frame_i) subtracted from the number of cepstral peaks for a $j^{th}$ frame (frame_j) is less than a value δ, and further if the number of cepstral peaks for an $x^{th}$ frame (frame_x) is less than, or equal to, a number of cepstral peaks for an $(x+1)^{th}$ frame (frame_x+1), as shown in the following relations (Eqn. (3)):

peak_num(ceps_data(frame_j))−peak_num
  (ceps_data(frame_i))<δ and peak_num(ceps_data(frame_x))≦peak_num
  (ceps_data(frame_x+1))

where frame_j≦frame_x<frame_I

If these conditions are satisfied, processing unit 125 may set the segmentation information for the previous frame (seg_info(frame_i−1)) to 1 [step 520] and the segmentation information for the current frame (seg_info(frame_i) to zero [step 525]. Otherwise, processing unit 125 may set the segmentation information for the previous frame (seg_info (frame_i−1)) to −1 [step 515]. Subsequent to steps 515 or 525, processing continues with step 605.

Figure 3:
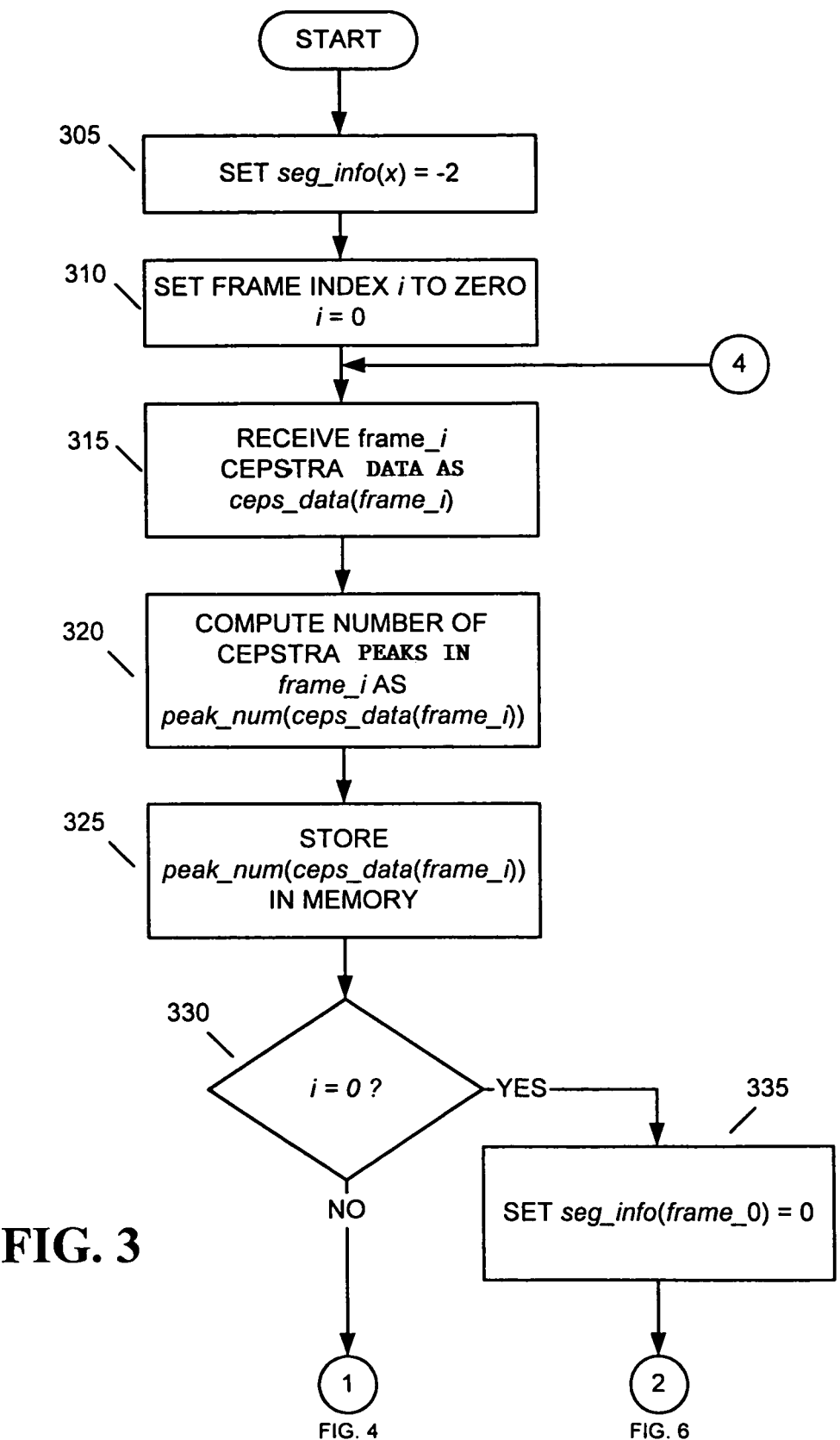
FIGS. 3–6 are flowcharts that illustrate exemplary processing for obtaining cepstra based HMM state/phoneme segmentation consistent with the present invention.
Figure 4:
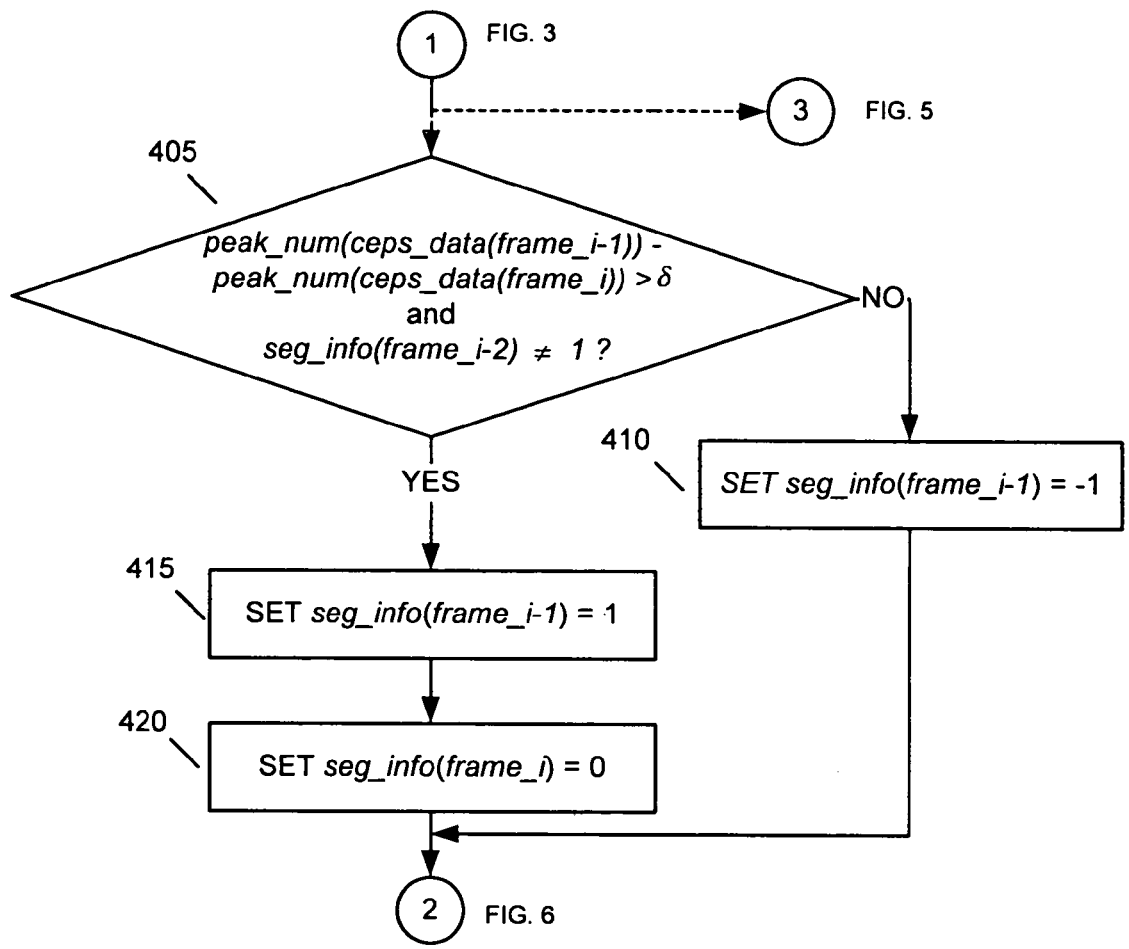
Figure 5:
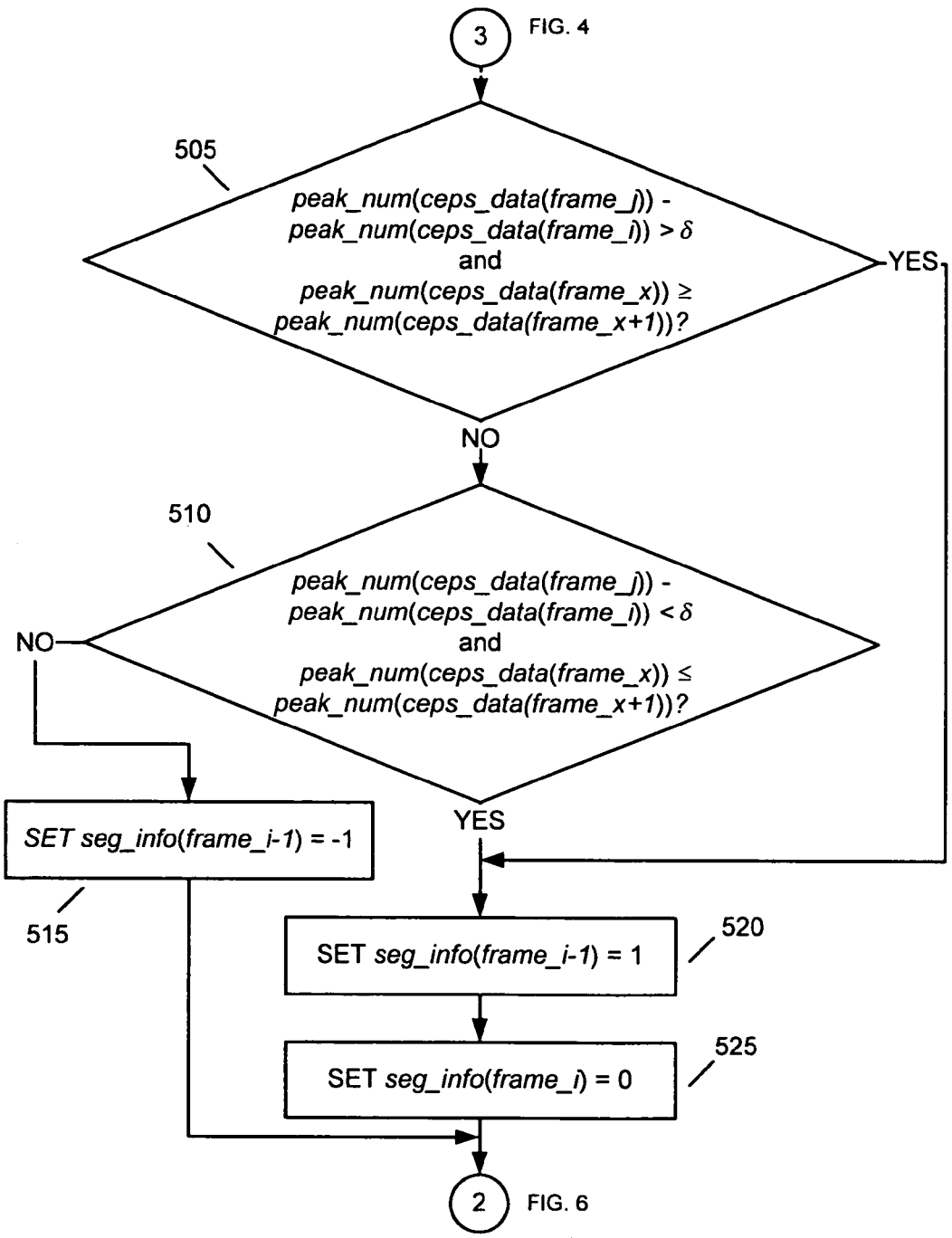

At step 605, processing unit 125 determines if the current frame (frame_i) is the last frame. If not, processing unit 125 increments the frame index i [step 610] and returns to step 315 (FIG. 3). If the current frame is the last frame, processing unit 125 sets the segmentation information for the current frame (seg_info(frame_i)) to 1 [step 615] and processing completes.

Exemplary Trainer/HMM Decoder

Output Score Processing

Figure 7:
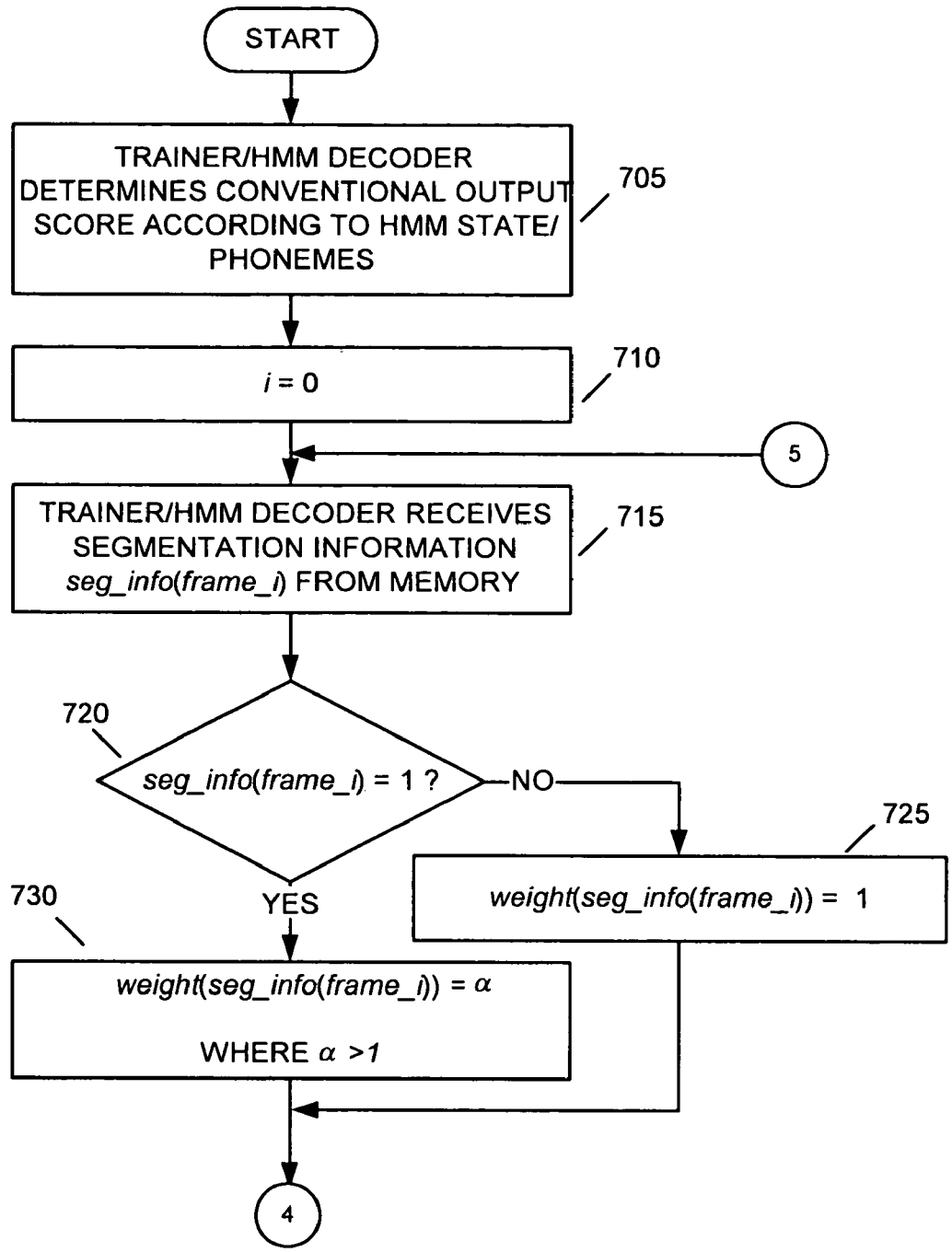
FIGS. 7–8 are flowcharts that illustrate exemplary processing for weighting trainer/HMM decoder output scoring, using cepstra-based HMM state/phoneme segmentation, consistent with the present invention.

FIGS. 7–8 are flowcharts that illustrate exemplary processing, consistent with the present invention, for weighting trainer/HMM decoder output scores. The method exemplified by FIGS. 7–8 may operate upon the end frame numbers identified using cepstra coefficient data, as described above. In other implementations consistent with the present invention, the end frame numbers are determined using other techniques. Additionally, the method exemplified by FIGS. 7–8 may be implemented within the training processes of trainer/HMM decoder 120.

As one skilled in the art will appreciate, the method exemplified by FIGS. 7–8 can be implemented as a sequence of instructions and stored within an internal memory (not shown) of trainer/HMM decoder 120 for execution by trainer/HMM decoder 120. Alternatively, the process may be implemented in hardware, or in any combination of hardware and software, within trainer/HMM decoder 120. Furthermore, the process may be implemented as a sequence of instructions and stored within memory 130 of speech recognition device 105 for execution by processing unit 125.

To begin processing, trainer/HMM decoder 120 may determine a conventional output score according to the conventionally determined phonemes or HMM states [step 705]. Trainer/HMM decoder 120 can then set a frame index value i to zero [step 710]. Trainer/HMM decoder 120 can receive the previously determined segmentation information (determined in the processing of FIGS. 3–6) from memory 130 [step 715]. At step 720, trainer/HMM decoder 120 determines if the segmentation information for the current frame (seg_info(frame_i)) equals one. If not, trainer/HMM decoder 120 sets a weight value for the current frame (weight(seg_info(frame_i))) to one [step 725]. If so, trainer/HMM decoder 120 sets the weight value for the current frame to a constant α, where α>1 [step 730].

Trainer/HMM decoder 120 may then determine an output score corresponding to the current frame and to a HMM state [step 805] (FIG. 8) using the following relation:

output_score(HMM_state,frame_i)= original_score
  (HMM_state)*weight(seg_info(frame_i))    Eqn. (4)

Trainer/HMM decoder 120 may further determine an output score corresponding to the current frame and to a phoneme [step 810] using the following relation:

output_score(phoneme,frame_i)= original_score
  (phoneme)*weight(seg_info(frame_i))    Eqn. (5)

At step 815, trainer/HMM decoder 120 can determine if the current frame is the last frame. If not, trainer/HMM decoder 120 increments the frame index i [step 820] and returns to step 715 (FIG. 7). If the current frame is the last frame, speech recognition device 105 may complete the speech recognition process using the weighted output scores in accordance with conventional techniques [step 825].

Exemplary HMM Decoder

Hypothesis Score Processing

FIGS. 9–10 are flowcharts that illustrate exemplary processing, consistent with the present invention, for weighting HMM decoder hypothesis scores. The method exemplified by FIGS. 9–10 may operate upon the end frame numbers identified using cepstra coefficient data, as described above. In other implementations consistent with the present invention, the end frame numbers are determined using other techniques.

As one skilled in the art will appreciate, the process exemplified by FIGS. 9–10 can be implemented as a sequence of instructions stored within memory 130 of speech recognition device 105 for execution by processing unit 125. Alternatively, the process may be implemented in hardware or in any combination of hardware and software.

To begin processing, processing unit 125 may set a counter value j to zero [step 905]. Processing unit 125 then may receive a jth recognition hypothesis from HMM decoder 120 [step 910]. The received $j^{th}$ recognition hypothesis can include a hypothesis score (hyp_score$_j$) and hypothesis segmentation information (hyp_seg_info$_j$) determined by HMM decoder 120 in accordance with conventional techniques. The hypothesis segmentation information (hyp_seg_info$_j$) includes a set of conventional elements specifying frame numbers of frames that end a phoneme. For example, hyp_seg_info$_j$=[ef$_1$, ef$_2$, ef$_3$, ef$_4$, . . . , ef$_{50}$], where ef$_n$ equals a frame number that ends a phoneme and n equals the index of each frame number. Processing unit 125 can then set a value k equal to zero [step 915]. Processing unit 125 may retrieve a $k^{th}$ frame number of the hypothesis segmentation information (hyp_seg_info$_j$) and designate the $k^{th}$ frame number as a value x [step 920].

Processing unit 125 may further retrieve, from memory 130, the previously determined segmentation information (determined in the processing of FIGS. 3–6) for all values of y (seg_info(frame_y)) that satisfy the following relation:

$$|y-x|<\Delta \qquad \text{Eqn. (6)}$$

[step 925]. Processing unit 125 may determine if any of the retrieved y values of the segmentation information is equal to 1 [step 930]. If not, processing proceeds with step 1015 (FIG. 10). If so, processing unit 125 may add a weight to the $j^{4th}$ hypothesis score [step 935] according to the following relation:

$$\text{hyp\_score}_j=\text{hyp\_score}_j+\text{weight} \qquad \text{Eqn. (7)}$$

Processing unit 125 may then determine if k is equal to the index of the last frame number in the hypothesis segmentation information (hyp_seg_info$_j$) [step 940]. If k is not equal to the index of the last frame number, processing unit 125 increments k [step 945] and returns to step 920. If k is equal to the index of the last frame number, processing may proceed to step 1015 (FIG. 10).

At step 1015, processing unit 125 determines if all hypotheses received from HMM decoder 120 have been processed. If not, processing unit 125 increments j [step 1010] and returns to step 910 (FIG. 9). If all hypotheses have been processed, processing unit 125 re-orders the recognition hypotheses received from HMM decoder 120 based on the resulting hypothesis scores [step 1020] as possibly weighted by the processing of step 1005. Processing unit 125 may then complete the speech recognition process using the re-ordered recognition hypotheses in accordance with conventional techniques [step 1025].

CONCLUSION

Systems and methods, consistent with the present invention, provide mechanisms that improve segmentation in speech recognition systems using cepstral coefficients. A number of cepstral coefficient peaks for each frame of received acoustic data can be used, in a manner consistent with the present invention, to segment the acoustic data for improved speech recognition processing.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain components of the invention have been described as implemented in hardware and others in software, other configurations may be possible. Also, while series of steps have been described with regard to FIGS. 3–10, the order of the steps may be altered in other implementations. No element, step, or instruction used in the description of the present application should be construed as critical or essential to the invention unless explicitly described as such. The scope of the invention is defined by the following claims and their equivalents.

What is claimed is:

1. A method of recognizing patterns in acoustic data, comprising:
   receiving frames of acoustic data;
   determining first cepstral coefficients corresponding to the received frames of acoustic data;
   determining second cepstral coefficients corresponding to the received frames of acoustic data;
   determining a first number of peaks in the first cepstral coefficients and a second number of peaks in the second cepstral coefficients;
   determining at least one weighting parameter based on the determined second number of peaks; and
   recognizing patterns in the received frames of acoustic data using the at least one weighting parameter.

2. The method of claim 1, further comprising:
   comparing the determined first and second number of peaks.

3. The method of claim 2, wherein the recognizing patterns in the frames of acoustic data is based on the comparison.

4. The method of claim 1, further comprising:
   determining, based on the received frames of acoustic data, recognition hypothesis scores using a Hidden Markov Model.

5. The method of claim 4, further comprising:
   modifying the recognition hypothesis scores based on the at least one weighting parameter.

6. The method of claim 5, wherein the recognizing of the patterns in the frames of acoustic data further uses the modified recognition hypothesis scores.

7. The method of claim 5, further comprising:
   re-ordering the modified recognition hypothesis scores.

8. The method of claim 7, wherein the recognizing of the patterns in the frames of acoustic data further uses the re-ordered modified recognition hypothesis scores.

9. A speech recognition system, comprising:
   means for receiving frames of acoustic data;
   means for determining a first number of peaks of cepstral coefficients corresponding to the received frames of acoustic data;
   means for determining a second number of peaks of cepstral coefficients corresponding to the received frames of acoustic data;
   means for determining at least one weighting parameter based on the determined second number of peaks; and
   means for recognizing patterns in the frames of acoustic data using the at least one weighting parameter.

* * * * *